(12) United States Patent
Gallagher et al.

(10) Patent No.: US 8,468,809 B2
(45) Date of Patent: *Jun. 25, 2013

(54) SYSTEM AND METHOD FOR REMOVING PARTICULATE MATTER FROM A DIESEL PARTICULATE FILTER

(75) Inventors: Shawn Michael Gallagher, Erie, PA (US); Roy Primus, Niskayuna, NY (US); Jennifer Topinka, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/022,951

(22) Filed: Feb. 8, 2011

(65) Prior Publication Data
US 2011/0126516 A1 Jun. 2, 2011

Related U.S. Application Data

(63) Continuation of application No. 11/838,296, filed on Aug. 14, 2007, now Pat. No. 7,925,431.

(51) Int. Cl.
*F01N 3/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .......... 60/295; 60/276; 60/286; 60/297; 701/19; 701/202; 701/213

(58) Field of Classification Search
USPC .......... 60/276, 277, 284, 285, 286, 295, 60/297; 123/676; 701/19, 201, 202, 213, 701/300
See application file for complete search history.

(56) References Cited

U.S. PATENT DOCUMENTS

| 4,520,624 A | 6/1985 | Kiyota |
| 6,415,606 B1 | 7/2002 | Bowman et al. |
| 6,438,948 B2 | 8/2002 | Ono et al. |
| 6,758,037 B2 | 7/2004 | Terada et al. |
| 6,912,848 B2 | 7/2005 | Bedapudi |
| 7,240,481 B2 | 7/2007 | Ament |

(Continued)

FOREIGN PATENT DOCUMENTS

| EP | 1382374 A | 1/2004 |
| EP | 1415779 A | 5/2004 |

(Continued)

*Primary Examiner* — Kenneth Bomberg
*Assistant Examiner* — Audrey K Bradley
(74) *Attorney, Agent, or Firm* — GE Global Patent Operation; John A. Kramer

(57) ABSTRACT

A system is provided for removing particulate matter from a particulate filter. The system includes an engine controller coupled to a sensor and an engine, and a locomotive controller coupled to the engine controller. The sensor outputs a first alert signal to the engine controller, including the current load and the loading rate of one or more particulate filter units. The engine controller determines a projected load and projected loading rate of the one or more particulate filter units along a route, and a time gap or distance gap based on a trip plan until the one or more particulate filter units are fully loaded. The engine controller determines a time region or distance region to remove particulate matter from the filter unit.

10 Claims, 8 Drawing Sheets

U.S. PATENT DOCUMENTS

| | | |
|---|---|---|
| 2003/0196430 A1 | 10/2003 | Brown et al. |
| 2004/0103645 A1 | 6/2004 | Bedapudi |
| 2005/0056009 A1 | 3/2005 | Otake et al. |
| 2005/0166580 A1 | 8/2005 | Pfaeffle et al. |
| 2005/0178272 A1 | 8/2005 | Kariya et al. |
| 2006/0100097 A1 | 5/2006 | Chigapov et al. |
| 2007/0220867 A1 | 9/2007 | Clerc et al. |

FOREIGN PATENT DOCUMENTS

| | | |
|---|---|---|
| EP | 1440722 A | 7/2004 |
| EP | 1484483 A | 12/2004 |
| EP | 1491248 | 12/2004 |
| EP | 1536109 A | 6/2005 |
| EP | 1882829 A | 1/2008 |
| FR | 2865767 | 8/2005 |
| FR | 2907162 A | 4/2008 |
| GB | 2393404 | 9/2002 |
| GB | 2384728 A | 8/2003 |
| GB | 2393404 A | 3/2004 |
| JP | 09317440 A * | 12/1997 |
| WO | WO 2005/077075 A | 8/2005 |
| WO | WO 2005/088094 A | 9/2005 |
| WO | WO 2008/062119 A | 5/2008 |

* cited by examiner

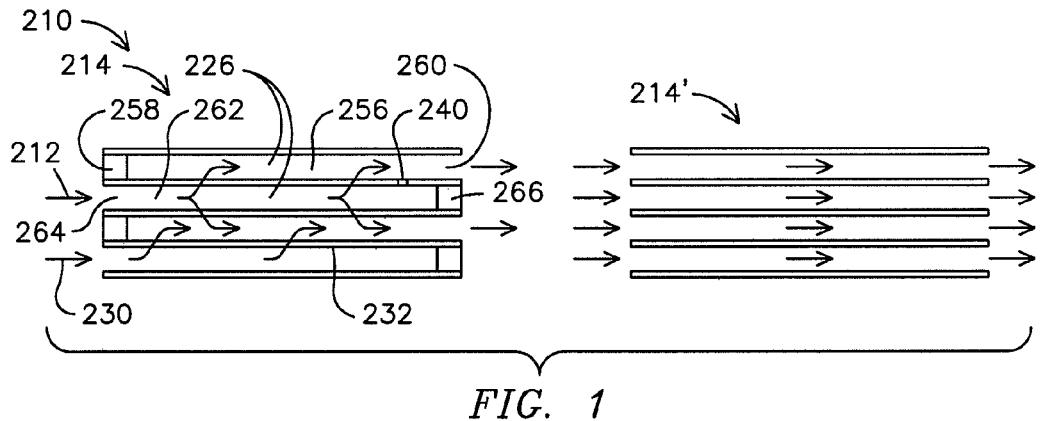
FIG. 1
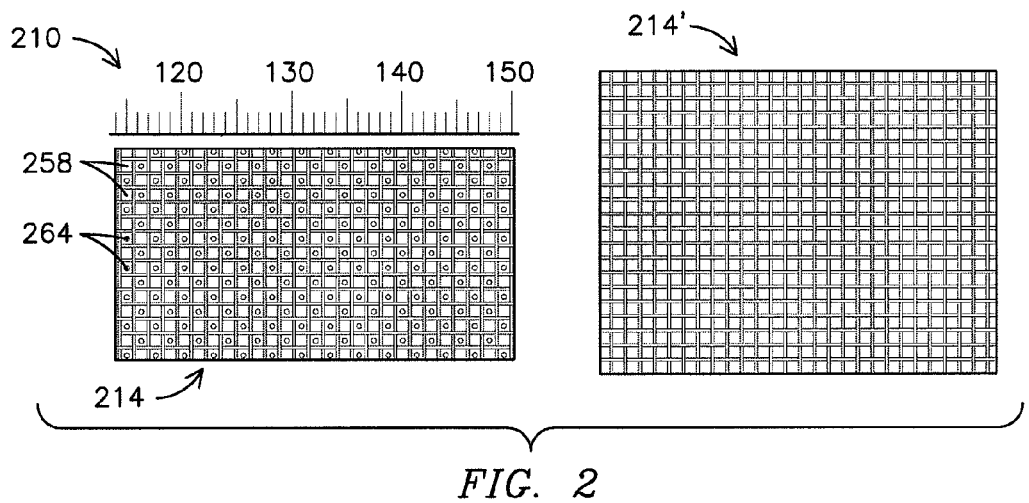
FIG. 2
| Cell Density, cpsi | 100 | 200 | 300 | 400 | 500 |
|---|---|---|---|---|---|
| Matrix Density, kg/m$^3$ | 340 | 550 | 630 | 740 | - |
| Matrix Specific Heat, J/K cm$^3$ | 0.17 | 0.28 | 0.32 | 0.37 | - |
| Uncoated Substance | | | | | |
| Hydraulic Diameter, mm | 2.192 | 1.419 | 1.211 | 0.997 | 0.914 |
| Open Area, % | 96 | 94 | 93 | 92 | 91 |
| Geometric Surface Area, m$^2$/l | 1.75 | 2.65 | 3.07 | 3.67 | 3.97 |
| Coated Substrate | | | | | |
| Hydraulic Diameter, mm | 2.35 | 1.60 | 1.34 | 1.08 | 0.998 |
| Open Area, % | 89 | 83 | 81 | 78 | 76 |
| Geometric Surface Area, m$^2$/l | 1.52 | 2.07 | 2.41 | 2.89 | 3.05 |
FIG. 9

| Configuration | 200/12 | 300/8 | 400/7 | 236/11.5 | 200/8 | 400/4 |
|---|---|---|---|---|---|---|
| Cell Shape | square | square | square | triangular | square | square |
| Material Compostion | EX-20 | EX-20 | EX-20 | EX-32 | EX-20 | EX-20 |
| Cell Density, cpsi | 200 | 300 | 400 | 236 | 200 | 400 |
| Wall Thickness, inch -mm | 0.012 0.30 | 0.008 0.21 | 0.007 0.18 | 0.0115 0.29 | 0.008 0.21 | 0.004 0.10 |
| Open Frontal Area, % | 69 | 74 | 74 | 64 | 79 | 83 |
| Geometric Surface Area, in²/in³ -m²/l | 47 1.85 | 60 2.36 | 69 2.72 | 56 2.21 | 50 1.97 | 73 2.87 |
| Hydraulic Diameter, inch -mm | 0.059 1.50 | 0.050 1.27 | 0.043 1.09 | 0.046 1.17 | 0.063 1.60 | 0.046 1.17 |
| Compressive Strength, B-Axis, psi -MPa | 980 6.76 | 750 5.17 | 525 3.62 | 915 6.81 | 150 1.03 | 150 1.03 |
| Axial MOR, psi | 625 | 540 | 440 | n/a | n/a | n/a |
| Isostatic Strength (9.5"x6"), psi | 1590 | 1100 | 1040 | n/a | n/a | n/a |
| Density, g/in³ -g/cm³ | 8.7 0.53 | 7.3 0.45 | 7.3 0.45 | 9.6 0.59 | 5.69 0.347 | 4.57 0.279 |

*FIG. 10*

SYSTEM AND METHOD FOR REMOVING PARTICULATE MATTER FROM A DIESEL PARTICULATE FILTER

RELATED APPLICATIONS

This application is a continuation application of U.S. patent application Ser. No. 11/838,296, filed on Aug. 14, 2007, now U.S. Pat. No. 7,925,431. This application is further related to U.S. patent application Ser. Nos. 11/838,277 and 11/838,299, filed concurrently with one another on Aug. 14, 2007. Each of the foregoing applications is incorporated by reference herein in their entirety.

FIELD OF THE INVENTION

This invention relates to aftertreatment systems, such as a diesel particulate filter, and more particularly to a system and method for removing particulate matter from a diesel particulate filter.

BACKGROUND OF THE INVENTION

Diesel engines have been extensively used in various applications, such as locomotives, for example. Diesel engine exhaust gas is typically outputted from the engine (or a turbocharger connected to the diesel engine) and directed to an output, such as to the atmosphere for a locomotive diesel engine, for example.

More stringent emissions standards on diesel engines have led to the introduction of aftertreatment systems to reduce emissions. Particulate matter is one such emissions constituent that is being more aggressively regulated. Strict particulate standards have led to the use of particulate trapping devices in the exhaust systems. These devices act like a filter to capture particulate matter in the exhaust.

After a prolonged period of operating time, the diesel particulate filter of the conventional system will become backlogged with excessive trapped particulate matter. This trapped particulate matter may be removed from the diesel particulate filter using various techniques, such as regeneration, for example. Regeneration is a technique used to clean particulate filters onboard the locomotive, when the particulate filter has captured enough soot particles to restrict exhaust flow below an acceptable level. Regeneration is accomplished by increasing the temperature of the particulate filter, causing the soot particles to oxidize and burn off of the particulate filter. The regeneration process typically removes carbon particles from the particulate filter, leaving only a small amount of ash. The accumulated ash eventually needs to be removed, but this removal process is usually undertaken during a scheduled maintenance. However, none of the conventional systems efficiently remove the trapped particulate matter from the diesel particulate filter, thus leading to a poor diesel exhaust gas flow rate and inefficient diesel engine operation.

Accordingly, it would be advantageous to provide a system to efficiently remove the trapped particulate matter from the diesel particulate filter, to improve the efficiency of the diesel engine while minimizing the energy loss resulting from such removal.

BRIEF DESCRIPTION OF THE INVENTION

One embodiment of the present invention provides a system for removing particulate matter from a diesel particulate filter. The diesel particulate filter includes at least one diesel particulate filter unit to filter the particulate matter from diesel engine exhaust gas received from a diesel engine of a locomotive. Additionally, the system includes an engine controller coupled to the diesel engine. Furthermore, the system includes a locomotive controller coupled to the engine controller. Additionally, the locomotive controller includes an algorithm to create a trip plan to optimize the performance of the locomotive along a route in accordance with a power setting of the diesel engine at each location along the route. Each sensor is configured to output a first alert signal to the engine controller upon the trapped particulate matter exceeding a predetermined threshold. The engine controller is configured to communicate with the locomotive controller upon receiving the first alert signal to determine a time region or distance region within the trip plan when the power setting exceeds a power threshold. The engine controller is configured to increase the temperature of the diesel exhaust gas entering the diesel particulate filter during the time region or distance region.

Another embodiment of the present invention provides a method for removing particulate matter from a diesel particulate filter. The diesel particulate filter includes at least one diesel particulate filter unit to filter the particulate matter from diesel engine exhaust gas received from a diesel engine of a locomotive. The method includes determining the extent of trapped particulate matter within the diesel particulate filter unit by positioning at least one sensor adjacent to the at least one of the diesel particulate filter unit. The method further includes creating a trip plan to optimize the performance of the locomotive along a route in accordance with a power setting of the diesel engine at each location along the route. The method further includes configuring each sensor to output a first alert signal to the engine controller upon the trapped particulate matter exceeding a predetermined threshold. The method further includes configuring the engine controller to communicate with a locomotive controller upon receiving the first alert signal to determine a time region or distance region within the trip plan when the power setting of the diesel engine is greater than a power threshold. Additionally, the method includes configuring the engine controller to increase the temperature of the diesel exhaust gas entering the diesel particulate filter during the time region or distance region upon receiving the first alert signal.

Another embodiment of the present invention provides a system for removing particulate matter from a particulate filter. The particulate filter includes at least one diesel particulate filter unit to filter the particulate matter from the engine exhaust gas received from an internal combustion engine of a locomotive. The system includes an engine controller coupled to the engine, where the engine controller includes a memory configured to store at least one loading rate of the at least one diesel particulate filter unit for at least one of a distance or time increment of the locomotive traveling along a route. The system further includes a locomotive controller coupled to the engine controller, where the locomotive controller includes an algorithm to create a trip plan to optimize the performance of the locomotive along a route in accordance with a power setting of the engine at each location along the route. The engine controller is configured to communicate with the locomotive controller upon the engine controller having determined that a level of trapped particulate matter within the at least one diesel particulate filter exceeds a predetermined threshold. The engine controller is configured to calculate the level of trapped particulate matter based upon an initial level of trapped particulate matter and the at least one loading rate at a distance or time increment. The engine controller is configured to further determine a time region or a distance region within the trip plan when the power setting exceeds a power threshold. The engine controller is configured to increase the temperature of the exhaust gas entering the particulate filter during the time region or distance region.

Another embodiment of the present invention provides computer readable media containing program instructions for removing particulate matter from a diesel particulate filter. The diesel particulate filter includes at least one diesel particulate filter unit to filter the particulate matter from diesel engine exhaust gas received from a diesel engine. The computer readable media includes a computer program code to configure the engine controller to increase the temperature of the diesel exhaust gas entering the diesel particulate filter upon receiving the first alert signal.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 depicts a schematic side view of an exemplary embodiment of a system for reducing particulate matter emission in engine exhaust gas;

FIG. 2 depicts a schematic end view of an exemplary embodiment of a system for reducing particulate matter emission in engine exhaust gas;

FIGS. 9 and 10 illustrates tables listing example parameters of Selective Catalyst Reduction (SCR) components as may be used in an example aftertreatment system.

DETAILED DESCRIPTION OF THE INVENTION

Figure 3:
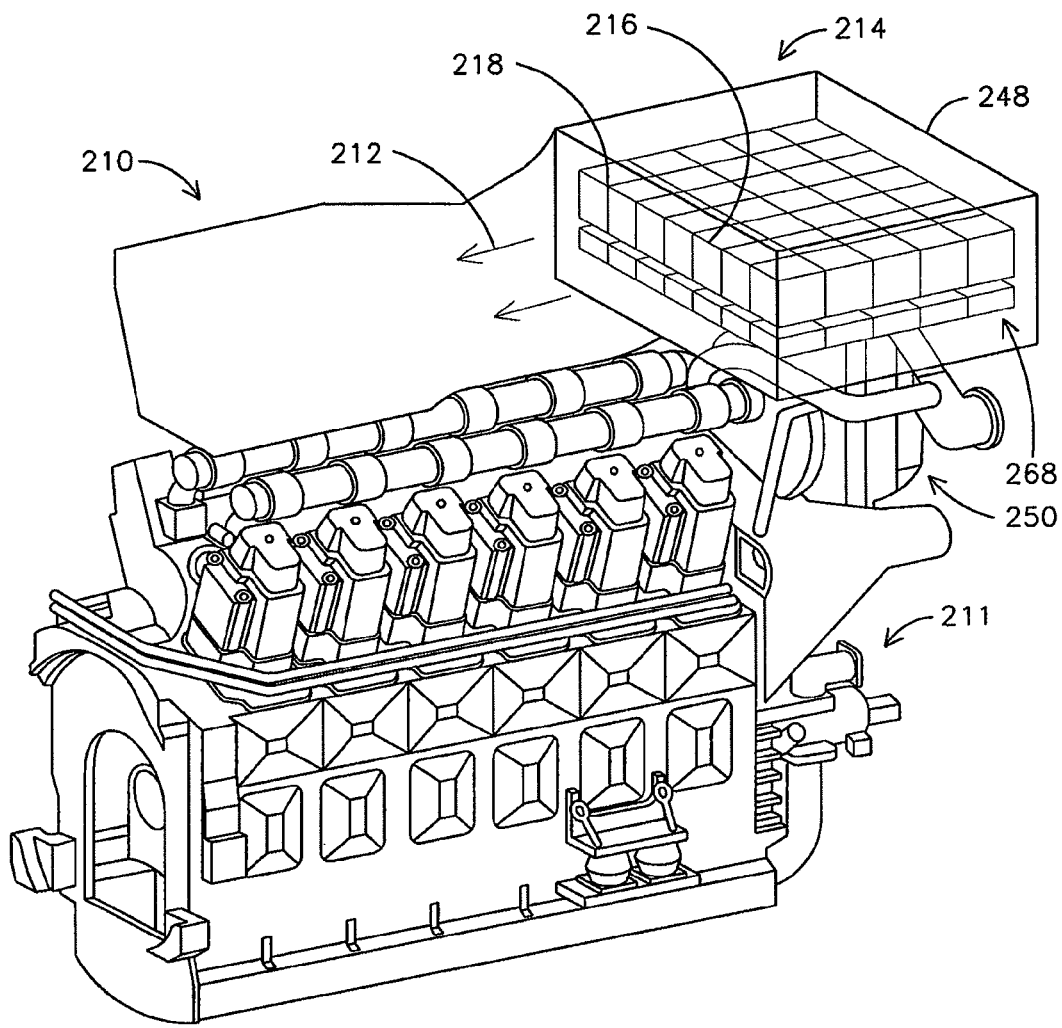
FIG. 3 depicts an isolated perspective view of an exemplary embodiment of a diesel engine among a system for removing particulate matter from a diesel particulate filter in accordance with the present invention.

Reference will now be made in detail to the embodiments consistent with the invention, examples of which are illustrated in the accompanying drawings. Wherever possible, the same reference numerals used throughout the drawings refer to the same or like parts.

FIGS. 1 and 2 illustrate exemplary embodiments of a wall-flow diesel particulate filter 214 and a flow-through diesel particulate filter 214'. The diesel particulate filter 214 illustrated in the exemplary embodiment of FIGS. 1 and 2 is an example of an aftertreatment system, and similar examples may be constructed for wall-flow diesel particulate filters, to chemically reduce any or all species in the diesel engine exhaust, such as hydrocarbons, CO, nitrous dioxide, and other chemicals appreciated by one of skill in the art, as further discussed below in additional embodiments of the present invention. As illustrated in FIG. 1, a diesel particulate filter unit 216 (FIG. 3) includes a plurality of channels 226 aligned in a flow direction 230 of the diesel engine exhaust gas 212. The channels 226 of each diesel particulate filter unit 216 are selectively configured with a distinct cross-sectional area density. The cross-sectional area density of a diesel particulate filter unit may be directly proportional to its resistance to a cross-sectional region of diesel exhaust gas. However, the cross-sectional area density of the channels may be the same for different diesel particulate filter units, or may be non-uniform across a diesel particulate filter unit.

As further illustrated in the exemplary embodiment of FIG. 1, a plurality of walls 232 are positioned to separate adjacent channels 226 of the diesel particulate filter unit 216. The walls 232 of the diesel particulate filter unit 216 are designed with a respective thickness. The wall thickness of the center diesel particulate filter unit 216 is greater than the wall thickness of the outer diesel particulate filter unit 218. The respective wall thickness of a diesel particulate filter unit may be directly proportional to its resistance to a cross-sectional region of diesel exhaust gas. However, the wall thickness may be the same for different diesel particulate filter units, or may be non-uniform across a diesel particulate filter unit.

As further illustrated in FIG. 1, a plurality of pores 240 are positioned within the plurality of walls 232, and the pores 240 are configured to vacate a distinct ratio of the area of the walls 232. The pores ratio of the walls of the center diesel particulate filter 216 is lower than the pores ratio of the walls of the outer diesel particulate filter 218. The pores ratio of the walls of a diesel particulate filter may be inversely proportional to its resistance to a cross-sectional region of diesel exhaust gas. However, the pores ratio may be the same for different diesel particulate filter units, or may be non-uniform across a diesel particulate filter unit.

As further illustrated in FIGS. 1 and 2, the plurality of channels 226 of the diesel particulate filter unit 216 include a plurality of first channels 256 with a blocked inlet 258 and an open outlet 260. Additionally, the plurality of channels 226 include a plurality of second channels 262 with an open inlet 264 and a blocked outlet 266. Each first channel 256 is positioned adjacent to a second channel 262, and each second channel 262 is positioned adjacent to a first channel 256. Although the first channel and second channel are illustrated in FIG. 1 with alternating blocked inlet/open inlet and blocked outlet/open outlet, each diesel particulate filter unit may include one or more channels with a blocked/open inlet and blocked/open outlet which is out of sequence with its adjacent channels.

During operation of the system 210, upon a respective cross-sectional region of the diesel exhaust gas 212 entering a second channel 262 of a diesel particular filter unit 216, the diesel exhaust gas is configured to pass through one of the walls 232 separating the plurality of first channels 256 and plurality of second channels 262. The diesel exhaust gas 212 subsequently passes into a first channel 256 and exits through the open outlet 260 of the first channel 256 to the atmosphere. However, various other paths may be taken by the diesel exhaust gas 212 through the diesel particulate filter 216. Upon the diesel exhaust gas 212 passing from the second channel 262, through the wall 232 and into the first channel 256, particulate matter of the diesel exhaust gas 212 is trapped within the pores 240 of the wall.

In designing each diesel particulate filter unit 216,218, the selective cross-sectional area density of the plurality of channels, the respective wall thickness and the ratio of pores within the walls is selectively determined based upon a flow rate of the respective cross-sectional region of the diesel exhaust gas 212 which is expected to pass over the respective diesel particulate filter unit 216,218. The plurality of diesel particulate filter units 216,218 may be comprised of silicon carbide, cordierite material, or any other material, or combination of materials appreciated by one of skill in the art.

As illustrated in FIG. 3, the diesel particulate filter 214 may include a diesel particulate filter housing 248 for the plurality of diesel particulate filter units 216,218. As further illustrated in FIG. 3, the diesel engine exhaust gas 212 is output from a locomotive diesel engine 211 into a turbocharger 250 and subsequently from a turbocharger outlet into the diesel particulate filter 214. As further illustrated in FIG. 3, the system 210 may include a catalyst device 268 positioned between the turbocharger 250 and the diesel particulate filter 214, to receive the diesel engine exhaust gas 212 output from the turbocharger. The catalyst device 268 is configured to increase the temperature of the diesel engine exhaust gas 212 directed into the diesel particulate filter 214, and may be contained within the housing 248.

Although the embodiment of the system 210 to reduce particulate matter emission in diesel engine exhaust gas 212 involves the use of a diesel particulate filter 214, various other aftertreatment systems may be utilized to control the distribution of exhaust flow over the cross section of the flow path by using aftertreatment substrates with different flow characteristics at the various locations across the channel. The embodiments of the present invention all include aftertreatment systems which may be used to alter the flow characteristic over the cross-section using a number of techniques. As described in the system 210 above, varying the cross-sectional area density and/or wall thickness of a wall-flow particulate filter (i.e., a particulate filter with alternating blocked inlet-open outlet channels, and open inlet-blocked outlet channels) is one example of such an aftertreatment system. However, another exemplary embodiment of the present invention involves an aftertreatment system to combine a wall-flow particulate filter 214, as illustrated in FIGS. 1 and 2, with a flow-through particulate filter 214' (i.e., a diesel particulate filter with an open inlet-open outlet channel arrangement), also illustrated in FIGS. 1 and 2 to get a favorable flow and thermal characteristic. Additionally, in an additional exemplary embodiment of the present invention, the materials of the flow-through particulate filters 214' or the wall-flow particulate filters 214 may be combined in such a fashion to get such favorable flow and thermal characteristics, and such materials may include silicon carbide, cordierite, mullite, or metal mesh, among others.

Figure 4:
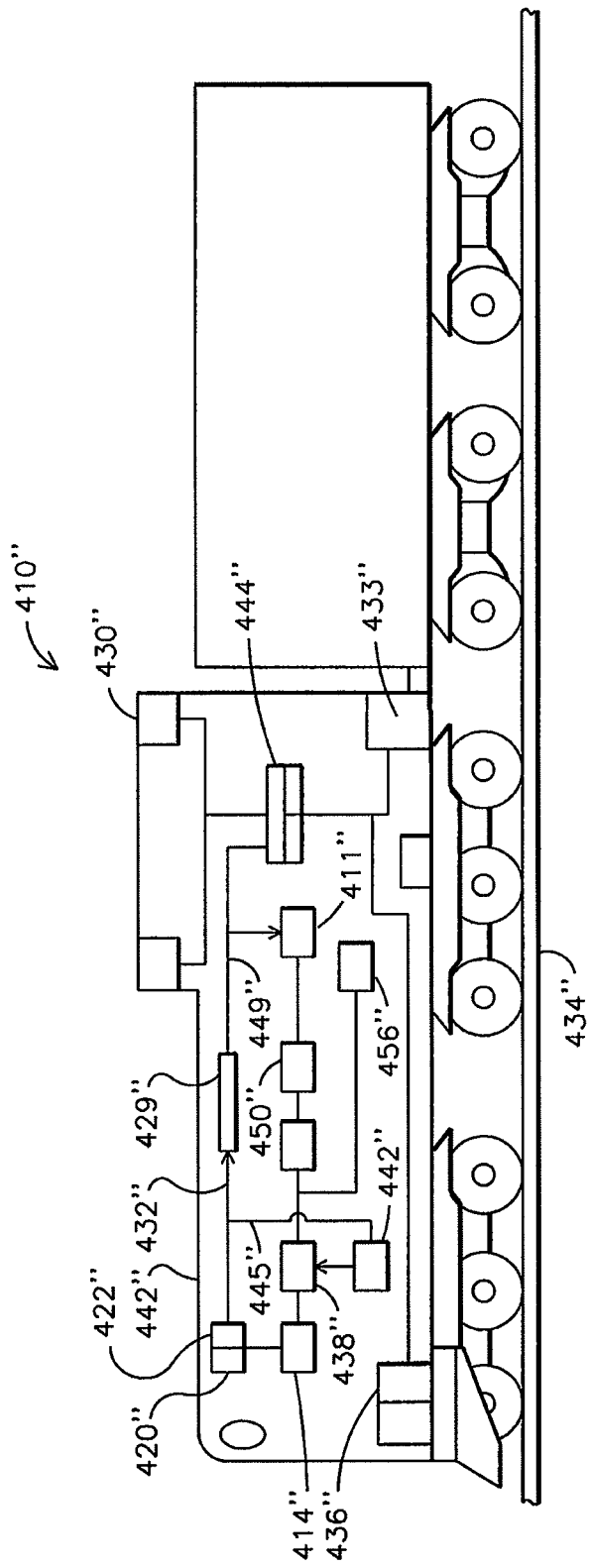
FIG. 4 depicts a schematic side view of an exemplary embodiment of a system for removing particulate matter from a diesel particulate filter in accordance with the present invention.

FIG. 4 illustrates another embodiment of a system 410" for removing particulate matter from a diesel particulate filter 414". The diesel particulate filter 414" includes a plurality of diesel particulate filter units to filter the particulate matter from diesel engine exhaust gas received from a diesel engine 411" of a locomotive 441". The system 410" includes a pair of sensors 420", 422" configured to determine the extent of trapped particulate matter within the diesel particulate filter 414". Additionally, the system 410" includes an engine controller 429" coupled to the pair of sensors 420", 422" and the diesel engine 411". The system 410" further includes a locomotive controller 444" coupled to the engine controller 429", where the locomotive controller 444" includes an algorithm to create a trip plan to optimize the performance of the locomotive 441" along a route 434" in accordance with a power setting of the diesel engine 411" at each location along the route 434". Additional details of systems including such engine controllers are disclosed in U.S. application Ser. Nos. 11/622,136 and 11/671,533, the entire contents of which are incorporated by reference herein. In an exemplary embodiment of the present invention, the optimization of the performance of the locomotive along the route 434" may be maximizing the fuel efficiency of the locomotive along the route, for example.

The system 410" involves performing regeneration (ie. removing trapped particulate matter) on the particulate filter 414", or other aftertreatment system, in cooperation with the algorithm of the locomotive controller 444". The system 410" first determines the load, or extent, of trapped particulate matter within the particulate filter 414", using a variety of methods, such as a pair of sensors 420", 422" described below. Alternatively, the system 410" may estimate the load of trapped particulate matter within the particulate filter 414", using experimentally known load rates, and calculating an estimated load of trapped particulate matter within the particulate filter 414" at incremental time or distance regions along the locomotive trip. Once the system 410" has estimated the load, or extent of trapped particulate matter within the particulate filter 414", the system 410" determines an upcoming distance or time limit gap until the particulate filter will become critically loaded with particulate matter, based upon the estimated particulate filter load, and future upcoming load rates. The system 410" determines a time or distance region within this respective time or distance limit gap to perform regeneration such that the engine notch profile during this time or distance region is sufficient to oxidize the trapped particulate matter within the particulate filter. As an example, the system may calculate that the particulate filter is 50% loaded with particulate matter, and estimate that it will become fully loaded in the next 45 minutes. Thus, in this example, the system would analyze the upcoming trip profile within the next 45 minutes and determine for ideal time to conduct a 20 minute regeneration cycle. As described in the previous example, the system 410" may perform regeneration prior to the particulate filter reaching a full load capacity. By performing the regeneration process during a time or distance region of the locomotive trip when the upcoming engine notch profile is sufficiently high, the engine exhaust temperature is already elevated, and thus a minimal amount of energy needs to be added to increase the engine exhaust temperature to oxidize the trapped particulate matter.

The system 410" provides further advantageous features, including selectively choosing those distance or time regions among the respective time or distance limit gap to perform regeneration. For example, regeneration is not desired when the locomotive is traveling through tunnels or within such closed areas, and thus the system 410" may selectively exclude distance or time regions from the trip profile when performing regeneration which overlap with the locomotive traveling through such closed regions or tunnels.

The pair of sensors 420", 422" are configured to continuously output a first alert signal 432" to the engine controller 429", where each first alert signal 432" includes a current load and/or a loading rate of particulate matter within the diesel particulate filter 414". Thus, the pair of sensors 420", 422" continuously determines a current load and loading rate of particulate matter within the diesel particulate filter 414", and transmit this current load and loading rate information, in the form of a first alert signal 432", to the engine controller 429".

Although FIG. 4 illustrates a pair of sensors 420", 422", only one sensor or more than two sensors may be utilized to determine the current load and/or loading rate, such as based on sensing the back pressure from the diesel particulate filter, for example. The engine controller 429" continuously receives the first alert signal 432" from the pair of sensors 420", 422", including the current load and loading rate of the diesel particulate filter 414", and the engine controller 429" communicates with the locomotive controller 444" to determine a projected load and/or a projected loading rate of particulate matter within the diesel particulate filter 414" along the route 434" based upon the trip plan. Additionally, the engine controller 429" is configured to communicate with the locomotive controller 444" to determine a time gap or a distance gap based on the trip plan along the route 434" until the particulate filter 414" is fully loaded with particulate matter. The engine controller 429" subsequently determines a time region or distance region within the respective time gap or distance gap to remove the particulate matter from the particulate filter 414", where determining the time region or distance region is based on one or more of the current load, the loading rate, the projected load during the time gap or distance gap, the projected loading rate during the time gap or distance gap, and the time gap or distance gap. Thus, for example, if the current load is 70% and the engine controller uses the known projected load and projected load rates to determine a time gap of 45 minutes (ie. particulate filter will fill up within 45 minutes), the engine controller 429" may determine a time region from t=20-25 minutes within the time gap, during which the trip plan (ie. engine output) is sufficiently high to completely oxidize the particulate matter within the particulate filter 414".

In an additional exemplary embodiment, the pair of sensors 420", 422" are configured to output a first alert signal 432" to the engine controller 429" upon the trapped particulate matter within the diesel particulate filter 414" exceeding a predetermined threshold. Upon receiving the first alert signal 432", the engine controller 429" is configured to communicate with the locomotive controller 444" to determine a time region or distance region within the trip plan when the power setting of the diesel engine 411" exceeds a power threshold. For example, if the power threshold is 500 HP, and from t=80-120 minutes or d=60-62 miles, the algorithm within the locomotive controller 444" determines that the power setting of the diesel engine 411" will be greater than 500 HP, the time region of t=80-120 minutes or the distance region of d=60-62 miles is communicated from the locomotive controller 444" to the engine controller 429". The engine controller 429" is then arranged to increase the temperature of the diesel exhaust gas entering the diesel particulate filter 414" during the time region or distance region, in order to remove the trapped particulate matter within the diesel particulate filter, as discussed in the previous embodiments and in further detail below.

As further illustrated in the exemplary embodiment of FIG. 4, the system 410" further includes a locator element 430" to determine a location of the locomotive 441" along the route 434". Such a locator element 430" may include any of a number of position determining devices, such as a GPS device, or wayside signals, for example. Additionally, the system 410" further includes a track characterization element 433" to provide information about a track, including topographic information, as discussed further below. The locomotive controller 444" is illustratively coupled to the locator element 430" and the track characterization element 433", and may communicate with these components to determine present track topographic information and to project future track topographic information for incremental positions along the route 434". The algorithm within the locomotive controller 444" may utilize the track information to estimate current and projected various operating characteristics of the locomotive 441", such as power settings of the diesel engine 411" when the locomotive 441" reaches each location along the route 434", for example. The locomotive controller 444" is operable to receive information from the locator element 430", the track characterizing element 433", and the engine controller 429". Some examples of such information provided by the track characterization element 433" at each location along the route 434" include a change in speed restriction along the route, a change in a track grade along the route, a change in track curvature along the route, and a change in a traffic pattern along the route, among others.

In the illustrated embodiment of the system 410", the track characterization element 433" may further include an on-board track database 436" configured to store an expected change in the track grade at each location along the route, an expected change in the track curvature at each location along the route, a change in the track pattern at each location along the route and/or an expected power setting at each location along the route 434". The track database 436" may include any information pertinent to the track topographic information and/or the power setting of the diesel engine 411" at each location along the route 434". Additionally, the on-board track database 436" may store historic information for previous runs such as the power setting at each location along a route 434" or any such similar locomotive operating condition at each location along the route 434", for a particular locomotive 441" along a particular route 434", or for various locomotives along a particular route 434". The engine controller 429" may communicate with the locomotive controller 444" and receive such historic information for previous runs, including previous power settings of the locomotive 441" at each location along the route 434", as communicated from the database 436".

As further illustrated in FIG. 4, the system 410" includes a turbocharger 450" includes an exhaust manifold to receive the diesel engine exhaust gas from the diesel engine 411" and an outlet to output the diesel exhaust gas to the diesel particulate filter 414". The system 410" further includes an injector device 433" positioned between the turbocharger 450" and the diesel particulate filter 414", where the injector device 433" is configured to selectively inject an adjustable amount of diesel fuel into the diesel engine exhaust gas exiting the outlet. Additionally, the system 410" includes a reactive device 438" positioned between the injector device 433" and the diesel particulate filter 414". The reactive device 438" is configured to selectively ignite the adjustable amount of injected diesel fuel within the diesel engine exhaust gas upon entering an inlet of the reactive device 438" to increase the temperature of the diesel exhaust gas entering the diesel particulate filter 414". Various reactive devices may be used, such as catalyst devices, fuel burners, and any other devices appreciated by one of skill in the art. The injection timing of the reactive device 438" may be retarded with electronic fuel injection systems to increase exhaust temperature. Additionally, with more advanced systems, such as common rail, a post injection may be used.

As further illustrated in the exemplary embodiment of FIG. 4, the system 410" includes a temperature sensor 442" coupled to the engine controller 429" and positioned adjacent to the reactive device 438". The temperature sensor 442" is configured to determine the temperature of the diesel engine exhaust gas entering the reactive device 438". The temperature sensor 442" is further configured to transmit a second alert signal 445" to the engine controller 429" upon measuring a temperature lower than a first minimum threshold for the reactive device 438" to ignite the diesel fuel. The first minimum threshold depends on various factors, including the type of reactive device, including its material components, method of reacting with the fuel, ambient temperature, and other factors to determine the minimum temperature at which the reactive device will ignite the diesel fuel, thereby increasing the temperature of the diesel exhaust gas containing the ignited diesel fuel. In an exemplary embodiment of the system 410", the first minimum threshold is approximately 200 degrees Celsius, and the temperature of the diesel engine exhaust gas is lower than the first minimum threshold when the locomotive diesel engine is in an idle state. However, the first minimum threshold may take any particular value consistent with a minimum temperature at which the reactive device ignites injected diesel fuel within the diesel exhaust gas.

The engine controller 429" is configured to increase the temperature of the diesel exhaust gas entering the reactive device 438" to greater than the first minimum threshold upon the engine controller 429" receiving the first alert signal 432" and the second alert signal 445". Thus, the engine controller 429" provides an initial increase in the temperature of the diesel exhaust gas, to at least the first minimum threshold, to enable a subsequent increase in the temperature of the diesel exhaust gas via ignition of the injected diesel fuel by the reactive device 438".

To initially increase the temperature of the diesel exhaust gas, the engine controller 429" is configured to provide this increase in temperature through a number of methods. For example, the engine controller 429" is configured to communicate with the locomotive controller 444" to determine the time region or distance region within the trip plan during which the engine controller 429" is configured to increase the temperature of the diesel exhaust gas entering the reactive device 438" above the first minimum threshold. Thus, upon engaging in communication with the locomotive controller 444", the engine controller 429" receives a time region or distance region, such as t=80-120 minute or d=60-62 miles when the diesel engine has a power setting greater than a power threshold, as discussed above, for example, and during which the engine controller 429" causes an increase in the temperature of the diesel exhaust gas entering the reactive device 438". Alternatively, the engine controller 429" may be configured to electrically couple an alternator 456" of the diesel engine 411" during the time region or distance region to the turbocharger output to cause an increase in the temperature of the diesel engine exhaust gas entering the reactive device 438".

As discussed in the previous embodiments of the present invention and illustrated in FIG. 1, each diesel particulate filter unit 216,218 of the diesel particulate filter 414" includes a plurality of channels 226 oriented parallel with the flow direction 230 of the diesel engine exhaust. The pair of sensors 420",422" are a pair of pressure sensors positioned on opposing sides of the plurality of channels 226 of the particulate filter unit 216 (FIG. 1). The pressure sensors 420",422" are configured to transmit the first alert signal 432" to the engine controller 429" upon measuring a pressure difference across the plurality of channels 226 which exceed a predetermined pressure threshold. As the trapped particulate matter accumulates within the walls of the diesel particulate filter 414", as discussed in the previous embodiments, the pressure difference across a channel 226, as measured by the pressures sensors 420", 422", increases. The predetermined pressure threshold may be selectively determined based upon a number of factors, including, for example, the time duration to remove the trapped particulate matter, the method of removing the trapped particulate matter, and the temperature of removing the trapped particulate matter.

After the engine controller 429" increases the temperature of the diesel exhaust gas entering the reactive device 438" above the first minimum threshold, the temperature sensor 442" measures this increase in temperature and transmits a third alert signal to the engine controller 429". Upon receiving the first alert signal 432" and the third alert signal during the time region or distance region, the engine controller 429" transmits an ignite signal to the reactive device 438" to ignite the injected fuel within the diesel engine exhaust to increase the temperature of diesel engine exhaust passing through an outlet of the reactive device 438" and into an inlet of the diesel particulate filter 414".

The reactive device 438" may be a catalyst device 438" and may include an internal catalyst component which facilitates igniting the injected fuel of the diesel exhaust gas and increases the temperature of the diesel exhaust gas at a temperature lower than in an absence of the catalyst device 438". During the ignition of the injected fuel within the diesel exhaust gas, the temperature of the diesel exhaust gas entering the catalyst device 438" increases to a first high temperature threshold to facilitate oxidization of the trapped particulate matter within the plurality of diesel particulate filter 414". This oxidization of the trapped particulate matter within the diesel particulate filter 414" at the first high temperature threshold is known as active regeneration. The trapped particulate matter may include a carbon material which oxidizes at the first high temperature threshold. In an exemplary embodiment of the present invention, the first high temperature threshold may be approximately 550 degrees Celsius, the oxidization may occur within an approximate temperature range of 550-600 degrees Celsius and the catalyst may be formed from cordierite, silicon carbide, mullite, metallic material or any combination of appropriate materials. However, other first high temperature threshold values and oxidization temperature ranges are possible, based on various factors including the material used, the amount of particulate matter to be oxidized, and the time duration of the regeneration, for example. Those elements not discussed herein, are similar to those elements discussed in the previous embodiments, with four-hundred scale double-prime number reference notation, and require no further discussion herein.

Figure 5:
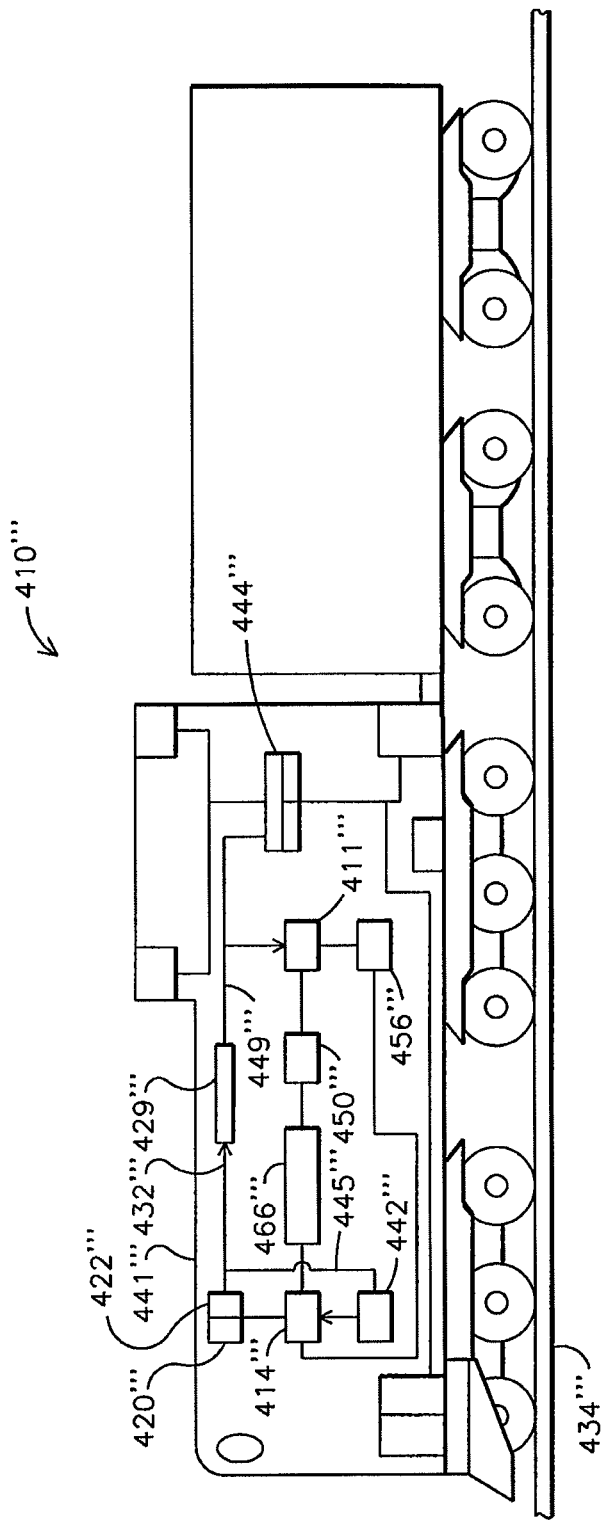
FIG. 5 depicts a schematic side view of an exemplary embodiment of a system for removing particulate matter from a diesel particulate filter in accordance with the present invention.

FIG. 5 illustrates an additional embodiment of a system 410''' of the present invention. Unlike the embodiment of the system 410" discussed above and illustrated in FIG. 4, in which active regeneration is used to oxidize trapped particulate matter from the diesel particulate filter, the system 410''' discloses a passive regeneration process to oxidize trapped particulate matter form the diesel particulate filter.

The system 410''' illustrated in FIG. 5 includes a turbocharger 450''' including an exhaust manifold to receive the diesel engine exhaust gas from the diesel engine 411' and an outlet to output the diesel exhaust gas to the diesel particulate filter 414". As discussed in the previous embodiment, the diesel particulate filter 414''' includes a plurality of diesel particulate filter units including a plurality of channels oriented parallel with the flow direction of the diesel engine exhaust. Additionally, a pair of pressures sensors 420''',422''' are positioned on opposing sides of the plurality of channels of the diesel particulate filter 414'''. The pressure sensors 420''',422''' are configured to transmit the first alert signal 432''' to the engine controller 429''' upon measuring a pressure difference across the channels which exceeds a predetermined pressure threshold, as discussed in the previous embodiments.

As further illustrated in the exemplary embodiment of FIG. 5, a temperature sensor 442''' is coupled to the engine controller 429''' and positioned adjacent to the diesel particulate filter 414''' including the plurality of diesel particulate filter units. The temperature sensor 442''' is configured to determine the temperature of the diesel engine exhaust gas entering the diesel particulate filter 414''' including the plurality of particulate filter units. Additionally, the temperature sensor 442''' is further configured to transmit a second alert signal 445''' to the engine controller 429''' upon measuring a temperature lower than a second maximum threshold for the diesel particulate filter 414'''. As discussed in further detail below, the second maximum threshold is the minimum temperature of the diesel exhaust gas at which the trapped particulate matter within the diesel particulate filter 414''' will oxidize in the presence of nitrous dioxide. The engine controller 429''' is configured to increase the temperature of the diesel exhaust gas during the time region or distance region entering the diesel particulate filter 414''' to the second maximum threshold upon the engine controller 429''' receiving the first alert signal 432''' and the second alert signal 445''' to facilitate oxidization of the particulate matter on the plurality of particulate filter units in the presence of nitrous dioxide.

To increase the temperature of the diesel exhaust gas entering the diesel particulate filter 414''', the engine controller 429''' is configured to increase the temperature of the diesel engine exhaust gas during the time region or distance region through facilitating the passage of diesel engine exhaust gas into the particulate filter 414'''. The diesel engine 411''' is configured with a power setting greater than the power threshold during the time region or distance region, as discussed previously. Alternatively, the engine controller 429''' is configured to electrically couple an alternator 456''' of the diesel engine 411''' during the time region or distance region to the turbocharger output to cause an increase in the temperature of the diesel engine exhaust gas entering the plurality of diesel particulate filter units of the diesel particulate filter 414'''. Although FIG. 5 illustrates the above-described arrangements to increase the temperature of the diesel exhaust gas, various other arrangements and methods may be utilized to increase the temperature of the diesel exhaust gas entering the diesel particulate filter. In an exemplary embodiment of the present invention, the second maximum threshold may be approximately 250 degrees Celsius and the oxidization in the presence of nitrous dioxide may occur in the approximate temperature range of 250-350 degrees Celsius. However, other second maximum threshold values and oxidization temperature ranges are possible, based on various factors including the material used, the amount of particulate matter to be oxidized, and the time duration of the regeneration, for example. Additionally, in the illustrated embodiment of FIG. 5, a nitrous dioxide filter 466''' is positioned upstream from the particulate filter 414''' to reduce the presence/concentration of nitrous dioxide in the diesel exhaust gas which enters the diesel particulate filter.

Figure 6:
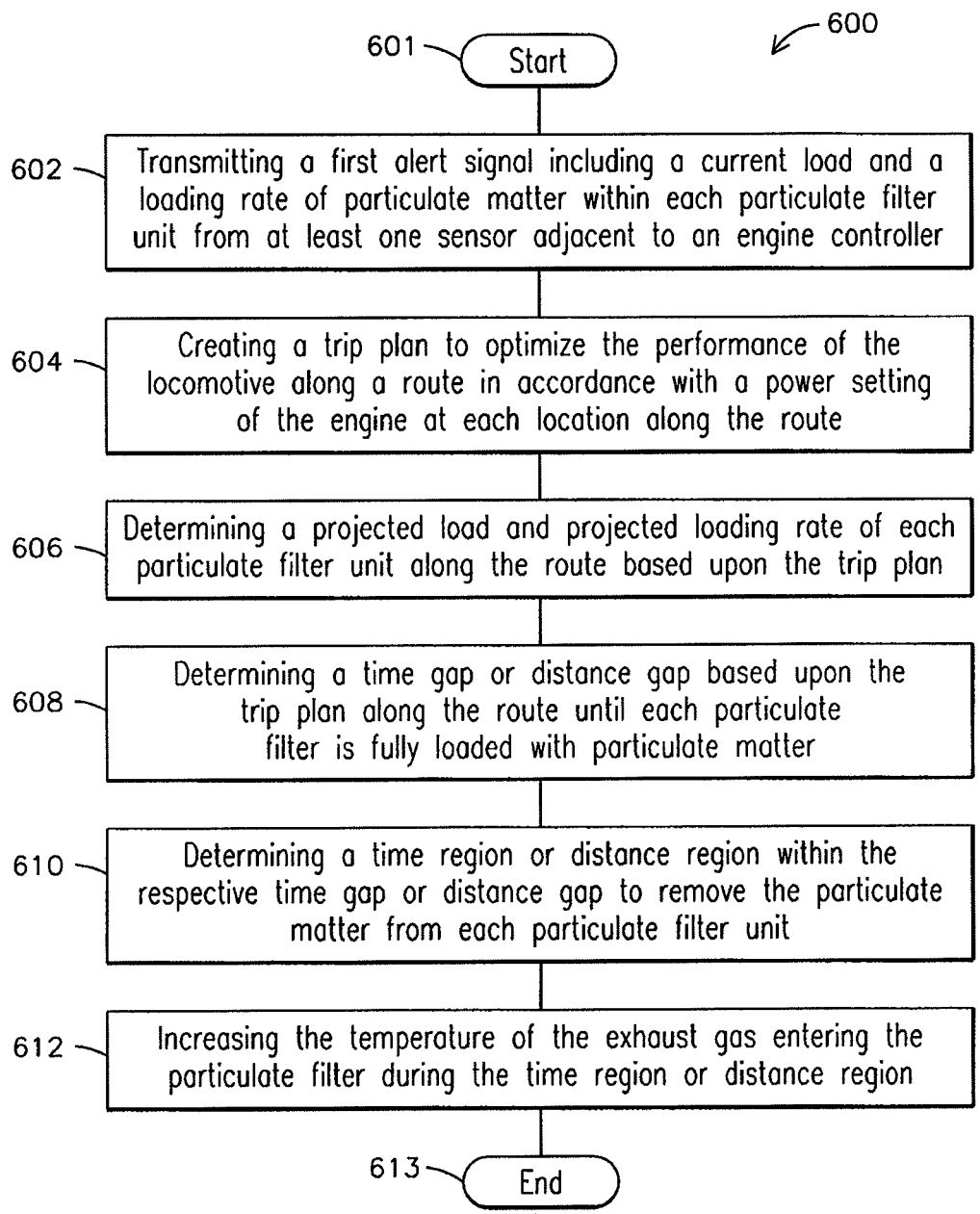
FIG. 6 depicts an exemplary embodiment of a method for removing particulate matter from a diesel particulate filter in accordance with the present invention.

FIG. 6 illustrates an exemplary embodiment of a method 600 for removing particulate matter from a diesel particulate filter 414'''. The particulate filter 414''' includes at least one particulate filter unit to filter the particulate matter from the engine exhaust gas received from an engine 411''' of a locomotive 441'''. The method 600 begins (block 601) by transmitting (block 602) a first alert signal 432''' including at least one of a current load and a loading rate of particulate matter within one or more particulate filter units from at least one sensor 420''',422''' adjacent to an engine controller 429'''. The method 600 further includes creating (block 604) a trip plan to optimize the performance of the locomotive along a route 434''' in accordance with a power setting of the engine 411''' at each location along the route 434'''. The method 600 further includes determining (block 606) a projected load and projected loading rate of one or more particulate filter units along the route 434''' based upon the trip plan. The method 600 further includes determining (block 608) a time gap or distance gap based upon the trip plan along the route 434''' until the one or more particulate filter unit is fully loaded with particulate matter. The method 600 further includes determining (block 610) a time region or distance region within the respective time gap or distance gap to remove the particulate matter from the one or more particulate filter units. The step of determining the time region or distance region is based upon at least one of the current load, the loading rate, the projected load, the projected loading rate, the time region and the distance region. The method 600 further includes increasing (block 612) the temperature of the exhaust gas entering the particulate filter 414''' during the time region or distance region, before ending at block 613.

Figure 7:
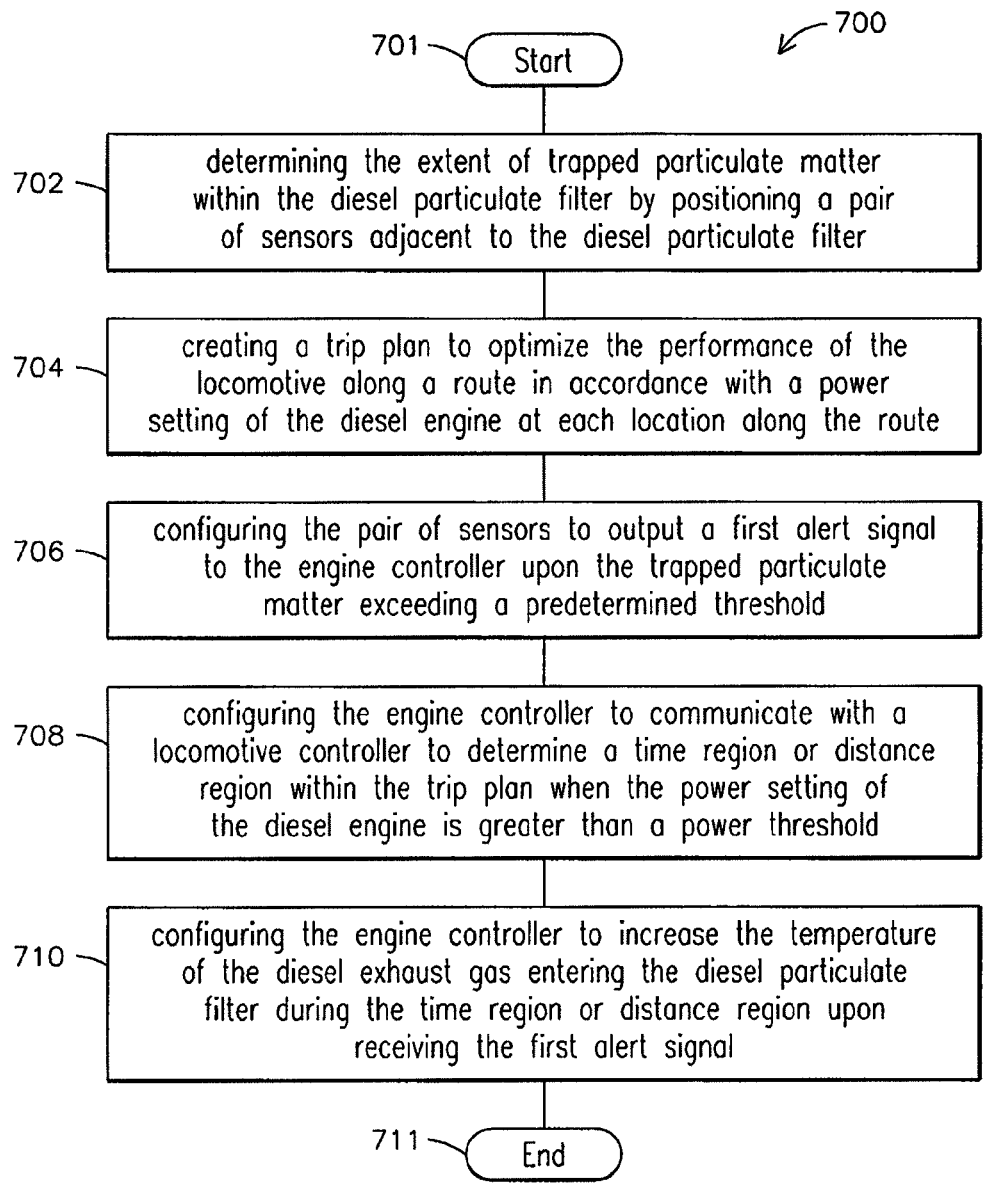
FIG. 7 depicts an exemplary embodiment of a method for removing particulate matter from a diesel particulate filter in accordance with the present invention.

FIG. 7 illustrates an exemplary embodiment of a method 700 for removing particulate matter from a diesel particulate filter 414'''. The diesel particulate filter 414''' includes at least one diesel particulate filter units to filter the particulate matter from diesel engine exhaust gas received from a diesel engine 411''' of a locomotive 441'''. The method 700 begins at 701 by determining (block 702) the extent of trapped particulate matter within the diesel particulate filter 414''' by positioning a pair of sensors 420''', 422''' adjacent to the diesel particulate filter 414'''. The method 700 further includes creating (block 704) a trip plan to optimize the performance of the locomotive 441''' along a route 434''' in accordance with a power setting of the diesel engine 411''' at each location along the route. The method 700 further includes configuring (block 706) the pair of sensors 420''', 422''' to output a first alert signal 432''' to the engine controller 429''' upon the trapped particulate matter exceeding a predetermined threshold. The method 700 further includes configuring (block 708) the engine controller 429''' to communicate with a locomotive controller 444''' upon receiving the first alert signal 432''' to determine a time region or distance region within the trip plan when the power setting of the diesel engine 411''' is greater than a power threshold. Additionally, the method 700 includes configuring (block 710) the engine controller 429''' to increase the temperature of the diesel exhaust gas entering the diesel particulate filter 414''' during the time region or distance region upon receiving the first alert signal 432'''.

Figure 8:
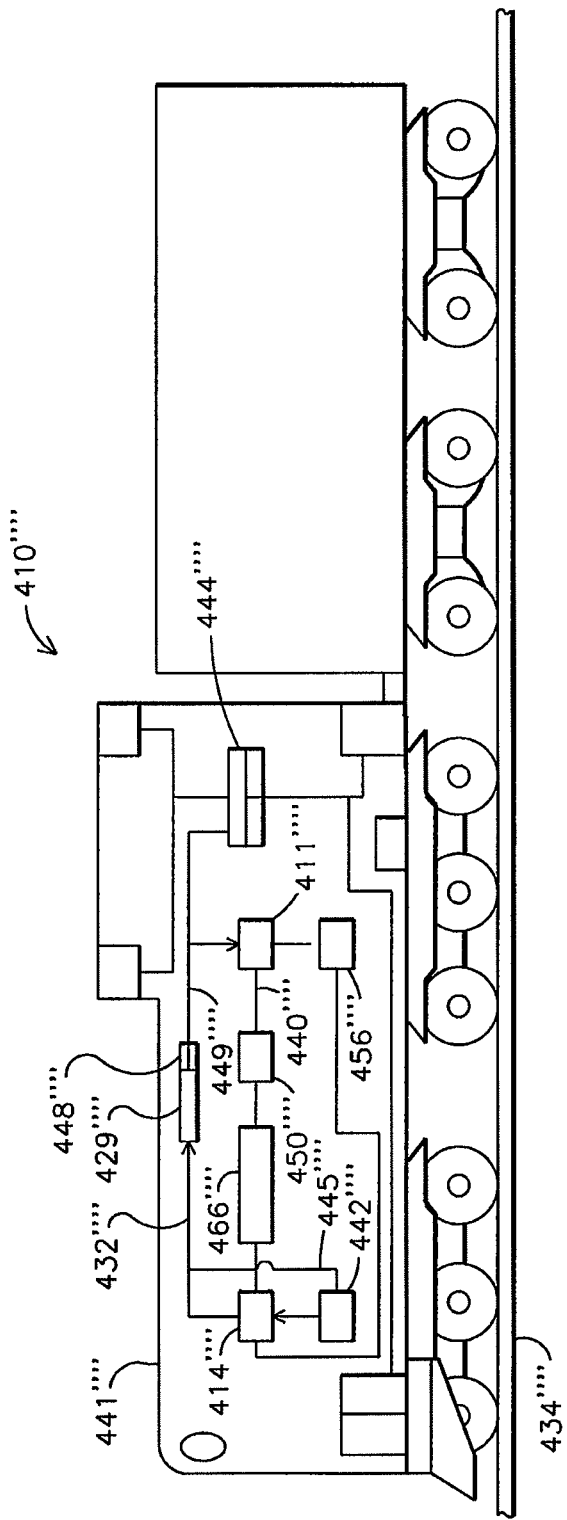
FIG. 8 depicts a schematic side view of an exemplary embodiment of a system for removing particulate matter from a diesel particulate filter in accordance with the present invention.

Another embodiment of the present invention is illustrated in FIG. 8 and provides a system 410'''' for removing particulate matter from a particulate filter 414''''. Unlike the systems illustrated in FIG. 4, the system 410'''' does not provide sensors to determine the extent of trapped particulate matter within the particulate filter, and instead the engine controller 429'''' includes an internal memory 448'''' into which is stored a plurality of load rates of the particulate filter, at each time or distance region along the locomotive route. The load rates at each time or distance region may be determined experimentally, or may be based upon previous data from the same locomotive along the same route or a similar locomotive along the same route. The engine controller is configured to calculate the level of trapped particulate matter within the particulate filter 414'''' based upon an initial level of trapped particulate matter and a plurality of loading rates during a respective plurality of time or distance increments along the locomotive route 434''''. As described above, the engine controller 444'''' is configured to perform an initial calculation of a time or distance limit gap until the particulate filter is fully loaded with trapped particles, and then is configured to subsequently determine a time or distance region within the time or distance limit gap when the power setting exceeds a power threshold. The engine controller is configured to increase the temperature of the exhaust gas entering the particulate filter during the time region or distance region such that the trapped particles within the particulate filter are oxidized. Those elements of the system 410'''' not discussed, are similar to those elements of the above embodiments, with quadruple prime notation, and require no further discussion herein.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

That which is claimed:

1. A method for removing particulate matter from a particulate filter used to filter engine exhaust gas from an engine of a vehicle, said method comprising:
    creating a trip plan to control the vehicle along a route, the trip plan specifying power settings of said engine at corresponding locations along the route;
    determining an extent of trapped particulate matter within said particulate filter;
    upon said extent of trapped particulate matter exceeding a predetermined threshold during a mission performed pursuant to said trip plan, analyzing upcoming portions of said trip plan to identify a time region or distance region during which to perform a regeneration cycle of said particulate filter based upon at least an upcoming power setting being greater than a power threshold, said upcoming power setting specified by said trip plan for said time region or distance region identified; and
    performing said regeneration cycle during said time region or distance region.

2. The method of claim 1, wherein said upcoming portions of said trip plan occur after a portion of a mission during which said at least one sensor output said first alert signal to said engine controller upon said trapped particulate matter exceeding a predetermined threshold and before a projected portion of said mission during which said particulate filter is projected to be fully loaded.

3. The method of claim 1, wherein said performing said regeneration cycle comprises:
    selectively injecting an amount of fuel during said time region or distance region into engine exhaust gas exiting an output of a turbocharger of the engine; and
    selectively igniting said amount of injected fuel with a reactive device.

4. The method of claim 3 further comprising:
    determining a temperature of said engine exhaust gas adjacent to said reactive device; and
    upon measuring a temperature lower than a first minimum threshold for said reactive device to ignite said injected fuel, increasing said temperature of said exhaust gas adjacent said reactive device above said first minimum threshold.

5. A method comprising:
    transmitting, to an engine controller of an engine of a vehicle, a first alert signal comprising at least one of a current load and a loading rate of particulate matter within at least one particulate filter unit from at least one sensor adjacent to said at least one particulate filter unit, said at least one particulate filter unit configured to filter said particulate matter from engine exhaust gas received from said engine;
    creating a trip plan to control the vehicle along a route;
    determining a projected load and projected loading rate of said at least one particulate filter unit along said route based upon said trip plan;
    determining a time gap or distance gap based upon said trip plan along said route until said at least one particulate filter is fully loaded with said particulate matter;
    determining a time region or distance region within said respective time gap or distance gap to remove said particulate matter from said at least one particulate filter unit, said determining said time region or distance region based upon at least one of said current load, said loading rate, said projected load, said projected loading rate, said time region and said distance region; and
    increasing a temperature of said exhaust gas entering said at least one particulate filter unit during said time region or distance region.

6. A system comprising:
    at least one sensor configured to determine the extent of trapped particulate matter within at least one particulate filter unit of a particulate filter, said particulate filter unit configured to filter said particulate matter from engine exhaust gas received from an internal combustion engine of a vehicle;
    an engine controller coupled to said at least one sensor and said engine; and
    a vehicle controller coupled to said engine controller, said vehicle controller configured to create a trip plan to control said vehicle along a route, the trip plan specifying power settings of said engine at corresponding locations along the route;
    wherein said at least one sensor is configured to output a first alert signal to said engine controller upon said trapped particulate matter exceeding a predetermined threshold, said engine controller is configured to communicate with said vehicle controller upon receiving said first alert signal to analyze upcoming portions of said trip plan to identify a time region or distance region during which to perform a regeneration cycle of said particulate filter unit based upon at least an upcoming power setting being greater than a power threshold, said upcoming power setting specified by said trip plan for said time region or distance region identified, and said engine controller is configured to increase the temperature of said exhaust gas entering said at least one particulate filter unit during said time region or distance region.

7. The system of claim 6, wherein said vehicle comprises a locomotive.

8. The system of claim 6, wherein said upcoming portions of said trip plan occur after a portion of a mission during which said at least one sensor output said first alert signal to said engine controller upon said trapped particulate matter exceeding a predetermined threshold and before a projected portion of said mission during which said particulate filter unit is projected to be fully loaded.

9. A system comprising:
    at least one sensor configured to determine at least one of a current load and a loading rate of particulate matter within at least one particulate filter unit, said at least one particulate filter unit configured to filter said particulate matter from engine exhaust gas received from an internal combustion engine of a vehicle;

an engine controller coupled to said at least one sensor and said engine; and a vehicle controller coupled to said engine controller, said vehicle controller configured to create a trip plan to control the vehicle along a route;

wherein said at least one sensor is configured to continuously output a first alert signal to said engine controller, said first alert signal including said current load and said loading rate of said at least one particulate filter unit, said engine controller is configured to determine a projected load and projected loading rate of said at least one particulate filter unit along said route based upon said trip plan, said engine controller is configured to communicate with said vehicle controller to determine a time gap or distance gap based upon said trip plan along said route until said at least one particulate filter unit is fully loaded with said particulate matter, said engine controller is configured to determine a time region or distance region within said respective time gap or distance gap to remove said particulate matter from said at least one particulate filter unit, said determination of said time region or distance region based upon at least one of said current load, said loading rate, said projected load, said projected loading rate, and said time gap or said distance gap, said engine controller being configured to increase a temperature of said exhaust gas entering said at least one particulate filter unit during said time region or distance region.

10. A method comprising:

determining an extent of trapped particulate matter within said at least one particulate filter unit using at least one sensor positioned adjacent to said at least one particulate filter unit, said at least one particulate filter unit configured to filter said particulate matter from engine exhaust gas received from an engine of a vehicle;

creating a trip plan to control the vehicle along a route in accordance with a power setting of said engine at each location along the route;

outputting a first alert signal to an engine controller upon said trapped particulate matter exceeding a predetermined threshold;

communicating with a vehicle controller upon said engine controller receiving said first alert signal to determine a time region or distance region within said trip plan when said power setting of said engine is greater than a power threshold;

receiving said engine exhaust gas in a turbocharger;

selectively injecting an amount of fuel during said time region or distance region with an injector device into said engine exhaust gas exiting an output of said turbocharger;

selectively igniting said amount of injected fuel during said time region or distance region within a reactive device, said injected fuel within said engine exhaust gas entering an inlet of said reactive device;

determining the temperature of said engine exhaust gas adjacent to said reactive device;

transmitting a second alert signal to said engine controller upon measuring a temperature lower than a first minimum threshold for said reactive device to ignite said injected fuel; and communicating with said vehicle controller upon said engine controller receiving said first and second alert signals, to determine said time region or distance region within said trip plan during which said engine controller is configured to increase the temperature of said exhaust gas entering said reactive device above said first minimum threshold.

* * * * *